(12) United States Patent
Hakla et al.

(10) Patent No.: US 10,985,584 B2
(45) Date of Patent: Apr. 20, 2021

(54) REACTIVE LED ILLUMINATED WIRELESS CHARGING SURFACE

(71) Applicant: Rockwell Collins, Inc., Cedar Rapids, IA (US)

(72) Inventors: Haytham Hakla, Winston-Salem, NC (US); Alexander Pozzi, Winston-Salem, NC (US); Aaron D. LaPrade, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 256 days.

(21) Appl. No.: 16/049,476

(22) Filed: Jul. 30, 2018

(65) Prior Publication Data
US 2020/0036205 A1    Jan. 30, 2020

(51) Int. Cl.
| | |
|---|---|
| *B64D 11/06* | (2006.01) |
| *H02J 7/02* | (2016.01) |
| *H02J 7/00* | (2006.01) |
| *F21V 3/06* | (2018.01) |
| *F21V 3/02* | (2006.01) |
| *F21Y 113/17* | (2016.01) |

(Continued)

(52) U.S. Cl.
CPC .............. *H02J 7/0047* (2013.01); *F21V 3/02* (2013.01); *F21V 3/06* (2018.02); *H02J 7/025* (2013.01); *F21Y 2105/10* (2016.08); *F21Y 2107/70* (2016.08); *F21Y 2113/17* (2016.08); *F21Y 2115/10* (2016.08); *H02J 7/0049* (2020.01)

(58) Field of Classification Search
CPC ........ H02J 7/0049; H02J 7/0047; H02J 50/10; H02J 7/0042; H02J 50/90; H02J 7/025; H02J 2310/40; F21V 3/02; F21V 3/06; F21Y 2105/10; F21Y 2113/17; F21Y 2107/70; F21Y 2115/10; B60Q 3/47; B60Q 3/14; H04B 5/0037
See application file for complete search history.

(56) References Cited

U.S. PATENT DOCUMENTS 9,205,914 B1 * 12/2015 Fagan ................. B64D 11/0015
10,037,847 B2 * 7/2018 Kwon ..................... H02J 50/40
(Continued)

OTHER PUBLICATIONS

Extended Search Report dated Nov. 26, 2019 for EP Application No. 19187847.9.

*Primary Examiner* — Jared Fureman
*Assistant Examiner* — Esayas G Yeshaw
(74) *Attorney, Agent, or Firm* — Suiter Swantz pc llo

(57) ABSTRACT

A reactive illuminated wireless charging surface incorporated into a seating module or worksurface aboard an aircraft or other mobile platform has a translucent exterior surface beneath which a wireless charging device may be positioned and over which a PED may be placed for charging. The illuminated wireless charging surface may incorporate arrays or strips of individually addressable light emitting diodes (LED) or other like luminous devices set into flexible printed control boards (PCB) beneath the exterior surface. The illuminated wireless charging surface may have a display controller for driving the LED arrays in practical or aesthetically appealing ways to provide dynamic visual indication of a charging status, e.g., by adjusting individual LEDs or groups thereof to shift in color or intensity according to predetermined or preprogrammed patterns.

18 Claims, 7 Drawing Sheets

(51) Int. Cl.
    *F21Y 105/10*     (2016.01)
    *F21Y 115/10*     (2016.01)
    *F21Y 107/70*     (2016.01)

(56) References Cited

U.S. PATENT DOCUMENTS

| | | | |
|---|---|---|---|
| 2011/0141057 A1* | 6/2011 | Sizelove | B60N 3/004 345/174 |
| 2013/0038280 A1* | 2/2013 | Boundy | H02J 7/0044 320/108 |
| 2015/0048752 A1 | 2/2015 | Van Den Brink et al. | |
| 2015/0331268 A1 | 11/2015 | Hohshi et al. | |
| 2015/0365737 A1 | 12/2015 | Miller et al. | |
| 2017/0077733 A1* | 3/2017 | Jeong | H02J 7/04 |
| 2017/0101187 A1* | 4/2017 | Noske | H02J 7/025 |
| 2018/0241233 A1* | 8/2018 | Kimura | H02J 7/0071 |

* cited by examiner

REACTIVE LED ILLUMINATED WIRELESS CHARGING SURFACE

BACKGROUND

Wireless charging devices may recharge the batteries of mobile telephones, tablets, and other suitably equipped portable electronic devices (PED) without the need to plug or connect the PED into a power outlet. For example, the PED may be placed over a wireless charging device (e.g., upon a pad or other designated charging surface) and receive power inductively, or via an electromagnetic field. However, the wireless charging device may have no means of displaying a progress or other status of an ongoing charge, or may be capable of only a binary status display (e.g., red/green, on/off, charging/complete).

SUMMARY

In one aspect, embodiments of the inventive concepts disclosed herein are directed to a reactive illuminated wireless charging surface incorporated into a seating module or worksurface aboard an aircraft or other mobile platform. The illuminated wireless charging surface has a translucent exterior surface beneath which a wireless charging device may be positioned; a PED may be placed over the portion of the exterior surface corresponding to the wireless charging device to commence charging. The illuminated wireless charging surface may incorporate arrays of individually addressable light emitting diodes (LED) or other like luminous devices set into flexible printed control boards (PCB) beneath the exterior surface. The illuminated wireless charging surface may have a display controller for driving the LED arrays in practical or aesthetically appealing ways to provide dynamic visual indication of a charging status, e.g., by adjusting individual LEDs or groups thereof to shift in color or intensity according to predetermined or preprogrammed patterns.

In a further aspect, embodiments of the inventive concepts disclosed herein are directed to a reactive illuminated wireless charging surface incorporated into a seating module or worksurface aboard an aircraft or other mobile platform. The illuminated wireless charging surface has an exterior surface (which may be translucent, opaque, or configured to mimic the outward appearance of wood, metal, concrete, bamboo, or other decorative materials). A wireless charging device may be positioned beneath the exterior surface, such that a PED may be placed over the portion of the exterior surface corresponding to the wireless charging device to commence charging. The illuminated wireless charging surface may incorporate arrays of individually addressable light emitting diodes (LED) or other like luminous devices set into flexible printed control boards (PCB) beneath the exterior surface. The exterior surface may incorporate arrays of blind holes or through holes aligned to the LEDs to facilitate the transmission of luminous output. The illuminated wireless charging surface may have a display controller for driving the LED arrays in practical or aesthetically appealing ways to provide dynamic visual indication of a charging status, e.g., by adjusting individual LEDs or groups thereof to shift in color or intensity according to predetermined or preprogrammed patterns.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
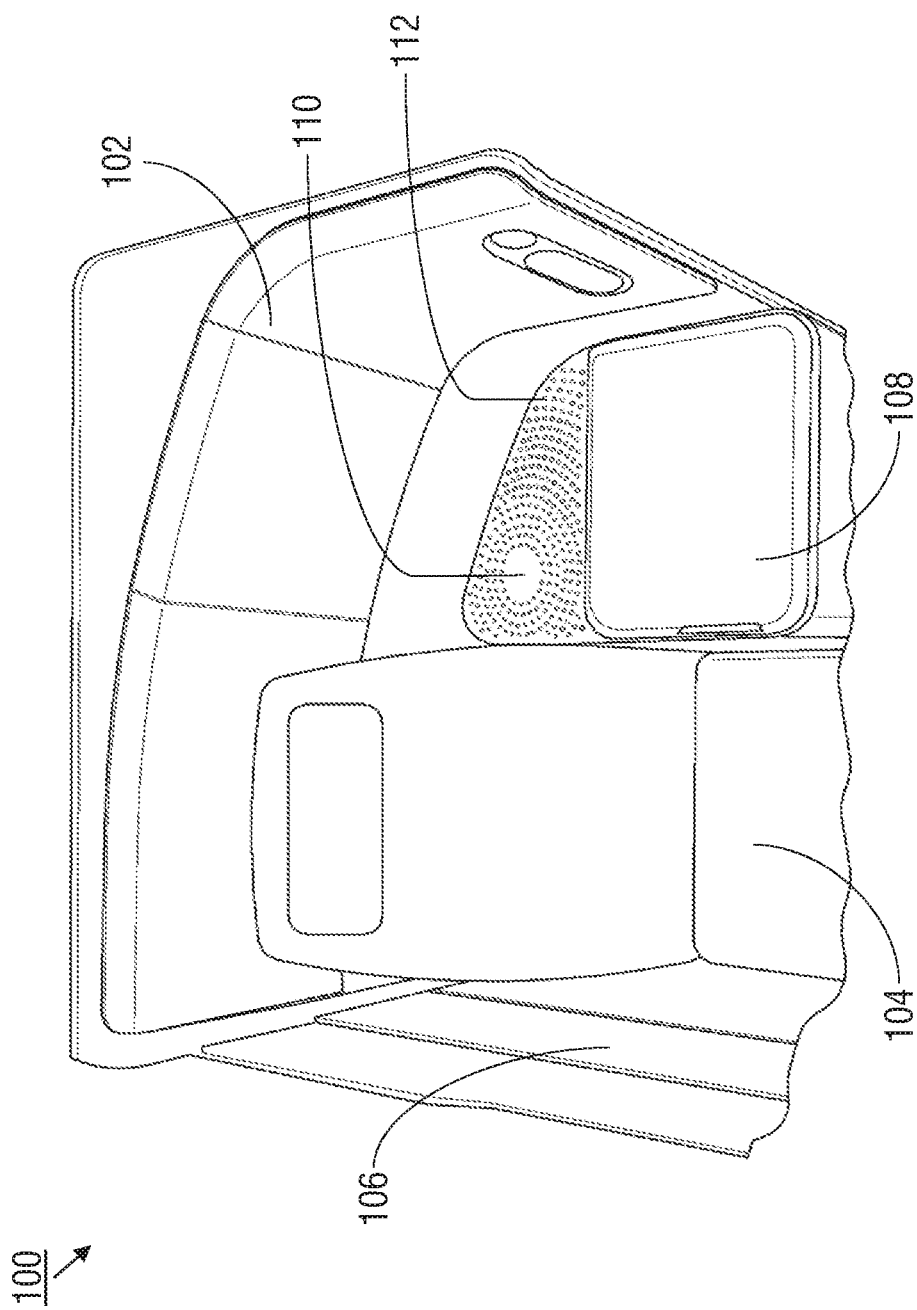
FIG. 1 illustrates an exemplary embodiment of a reactive illuminated wireless charging surface according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a dynamically reactive illuminated wireless charging surface installable aboard an aircraft or other vehicle, e.g., proximate to a seating area. The surface may incorporate an inductive or other like wireless charging device, which may be indicated to a passenger or guest via arrays of light-emitting diodes (LED). If a suitably equipped portable electronic device (PED) such as a tablet or smartphone is placed atop the wireless charger, the wireless charging surface may display a charging status of the PED in dynamic, practical, and aesthetically pleasing fashion.

Referring to FIG. 1, an exemplary embodiment of a reactive wireless charging surface 100 according to the inventive concepts disclosed herein may be incorporated into a seating module 102, e.g., a business-class or elite-class compartment aboard a commercial aircraft or a divan or like seating area aboard a business jet or luxury aircraft. For example, the seating module 102 may include an aircraft seat (104), partitions (106) for partially demarcating the aircraft seat from the cabin proper (e.g., defining a private area or a communal area), and an accessible surface (108) such as a translatable tray table (e.g., sliding, folding over) proximate to the reactive outer surface 110. The reactive wireless charging surface 100 may include a wireless charger (not shown) and one or more arrays of light-emitting diodes 112 (LED) or other like luminous devices arranged in patterns (e.g., concentric circles) beneath the reactive outer surface 110.

Figure 2A:
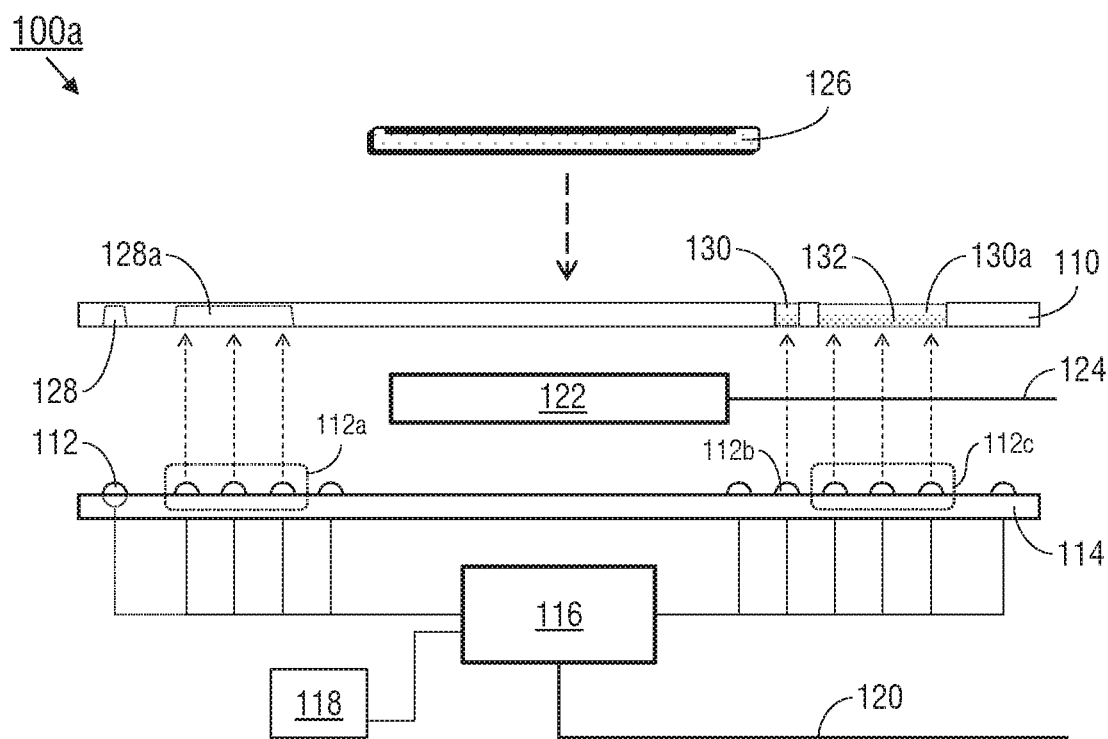
FIGS. 2A and 2B are diagrammatic cross-sectional illustrations of the illuminated wireless charging surface of FIG. 1.

Referring to FIG. 2A, the reactive wireless charging surface 100a may be implemented and may function similarly to the reactive wireless charging surface 100 of FIG. 1, except that the reactive wireless charging surface 100a may incorporate arrays of individually addressable LEDs 112 set into a rigid or flexible printed circuit board 114 (PCB) and driven by a display controller (116) which may include drive electronics for individually driving each LED 112 according to predetermined or preprogrammed patterns (e.g., stored in onboard memory (118) or accessible via an onboard network via aircraft network link (120)). For example, the display controller 116 may adjust the pattern of illuminated vs. deluminated LEDs (112) or the intensity and color of any individual LED or group thereof to visually indicate a charging status in practical or aesthetic ways.

The reactive wireless charging surface 100a may incorporate one or more wireless charging devices 122 beneath the reactive outer surface 110. The wireless charging device 122 may be connected to, and powered by, an aircraft power supply (124). For example, any suitably equipped portable electronic device 126 (PED) placed on the reactive outer surface 110 above the wireless charging device 122 may be inductively charged.

The reactive outer surface 110 may be fashioned of a translucent material, e.g., capable of at least partially transmitting the luminous output of the LEDs 112 while sufficiently opaque to conceal inactive LEDs (e.g., when the wireless charging device 122 is not in operation) and configurable according to the design specifications of the seating module (102, FIG. 1). For example, the reactive outer surface 110 may be translucent (in portions corresponding to the arrays of LEDs 112) with opaque portions throughout. In some embodiments, the reactive outer surface 110 may incorporate blind holes (128) partially extending through the reactive outer surface (e.g., from the inside surface proximate to the wireless charging device 122) and in alignment with the LEDs 112 to facilitate light transmission directly above, or proximate to, the LEDs.

The reactive outer surface 110 may include blind slots (128a) similar to the blind holes 128, except that the blind slots 128a may extend along the reactive outer surface in alignment with a group (112a) or strip of LEDs. In some embodiments, the reactive outer surface 110 may include through holes (130) fully extending through the reactive outer surface. The through holes 130 and through slots 130a may be implemented and may function similarly to the blind holes 128 and blind slots 128a, except that the through holes 130 and through slots 130a may extend fully through the reactive outer surface 110 and may be at least partially filled with a diffuser 132 (e.g., a diffusive resin) capable of diffusing the luminous output of an associated LED (112b) or group (112c) of LEDs.

Figure 2B:
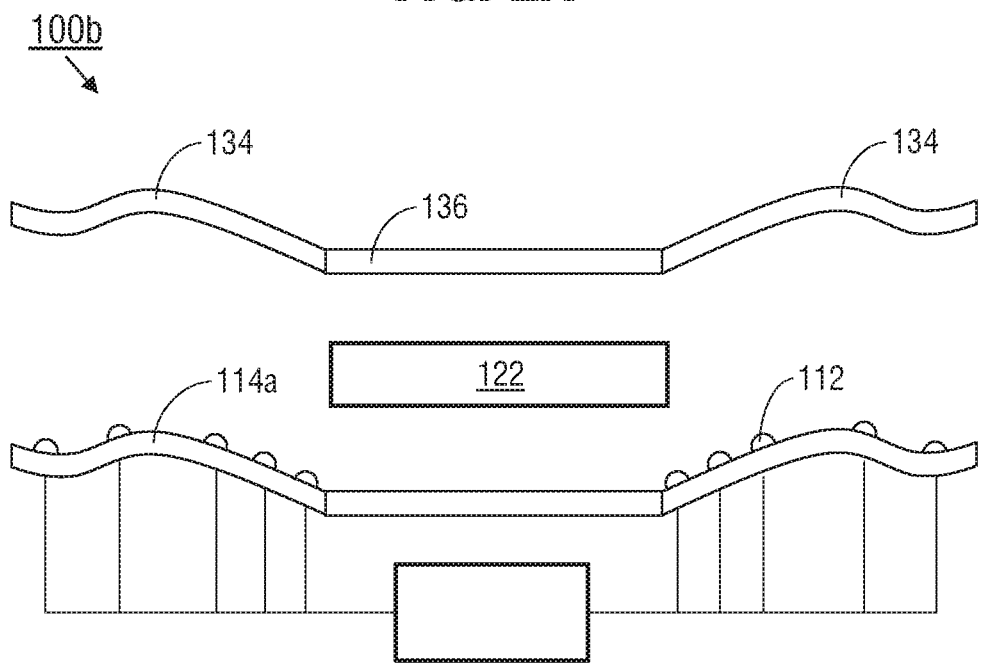

Referring also to FIG. 2B, the reactive wireless charging surface 100b may be implemented and may function similarly to the reactive wireless charging surface 100a, except that the reactive wireless charging surface 100b may include one or more nonplanar surfaces (134), e.g., surrounding or proximate to a planar portion (136) beneath which the wireless charging device 122 may be situated (the planar portion capable of accommodating the PED 126 (FIG. 2A)). In some embodiments, the PCB (114a) into which the LED arrays (112) are set may be a flexible PCB shaped to match the contour of the nonplanar surfaces 134.

Figure 3:
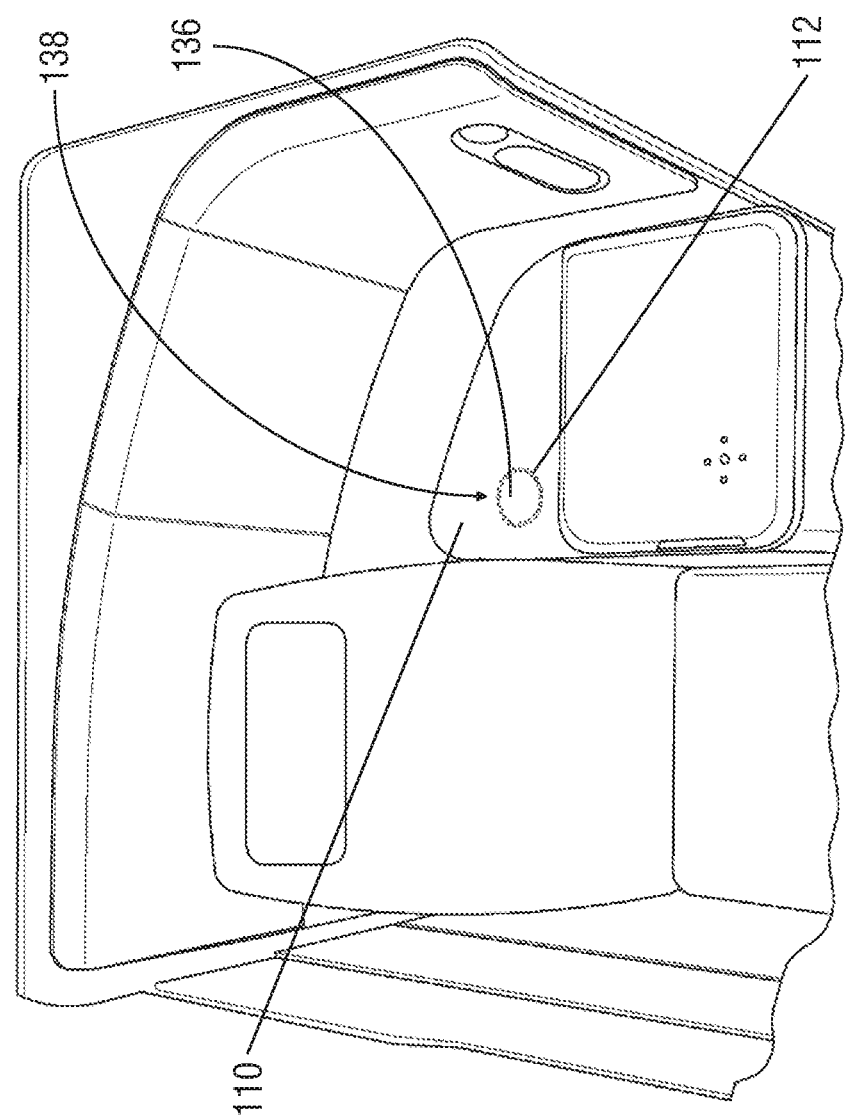
FIG. 3 illustrates the wireless charging surface of FIG. 1 in a dormant or non-charging state.

Referring to FIG. 3, the reactive wireless charging surface 100c may be implemented and may function similarly to the reactive wireless charging surfaces 100a-b of FIG. 2A/B, except that the reactive wireless charging surface 100c may remain in a relatively dormant state while a PED (126, FIG. 2A) is not in contact with the wireless charging device (120, FIG. 2B). For example, a ring (138) or other like group arrangement of LEDs 112 may be illuminated to indicate the planar portion 136, or the location of the wireless charging device 122 relative to the reactive outer surface 110. The ring 138 of LEDs 112 may be illuminated in a static fashion, e.g., as a uniformly lit ring of illuminated LEDs, or dynamically illuminated, e.g., as a rotating ring or a group of LEDs discreetly fluctuating in intensity or color.

Referring generally to FIGS. 4A through 4D, the reactive wireless charging surfaces 100d-g may be implemented and may function similarly to the reactive wireless charging surface 100c of FIG. 3, except that the reactive wireless charging surfaces 100d-e may respond dynamically when a PED 126 is placed over the wireless charging device (122, FIG. 2A) or on the planar portion 136 for charging, indicating a charging status of the PED in practical or aesthetically appealing ways. For example, referring in particular to FIGS. 4A and 4C, the LEDs 112 of the reactive wireless charging surface 100d, 100f may illuminate in a series of concentric circles, whereby, e.g., the intensity of each illuminated LED 112 gradually increases as the charging of the PED 126 reaches completion, or the number of illuminated concentric circles (or of illuminated LEDs) increases, with a decreasing amount of space between the illuminated circles. When the charging of the PED 126 is complete, the reactive wireless charging surface 100d may display yet another static or dynamic pattern of illuminated LEDs 112 to indicate that the charge is complete. The reactive wireless charging surface 100d may indicate an error state or a failed charge. For example, if any metallic material is disposed between the PED 126 and the wireless charging device 122, the PED 126 may not charge properly, and the reactive wireless charging surface 100d may so indicate.

Figure 4A:
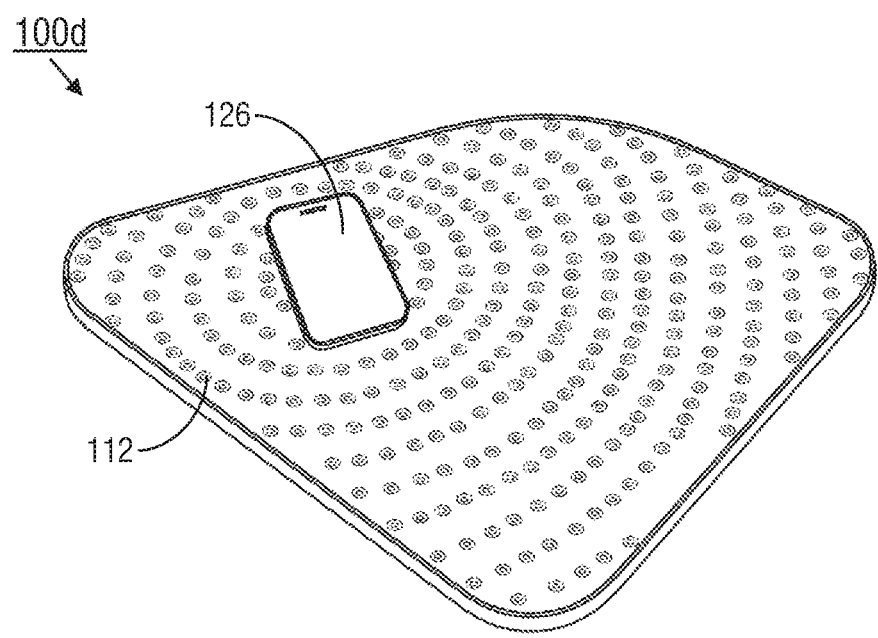
FIGS. 4A through 4D illustrate the wireless charging surface of FIG. 3 in a charging state.
Figure 4B:
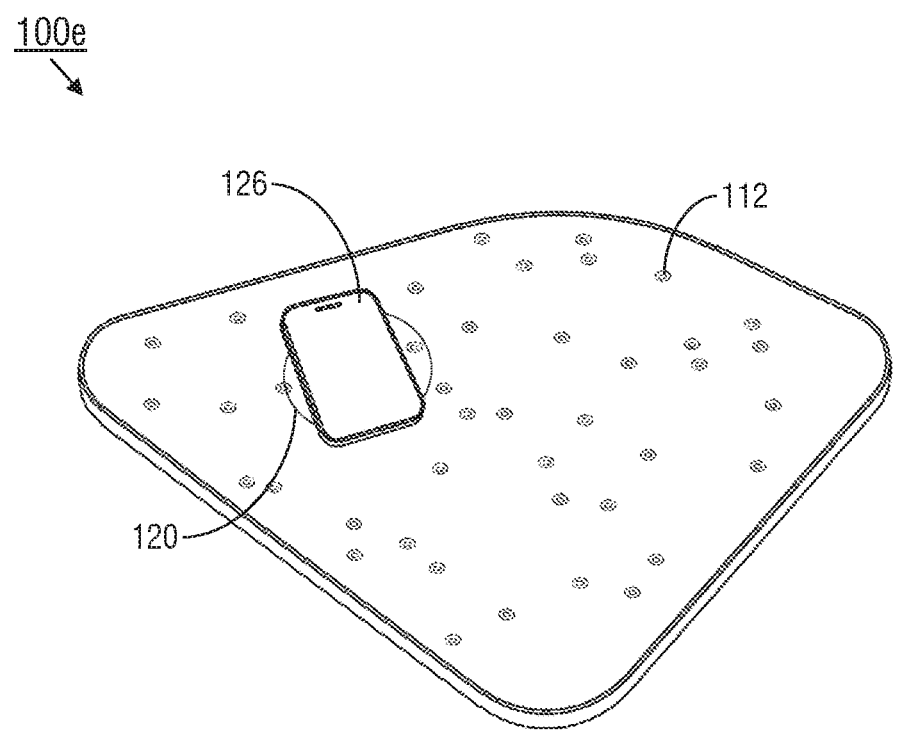
Figure 4C:
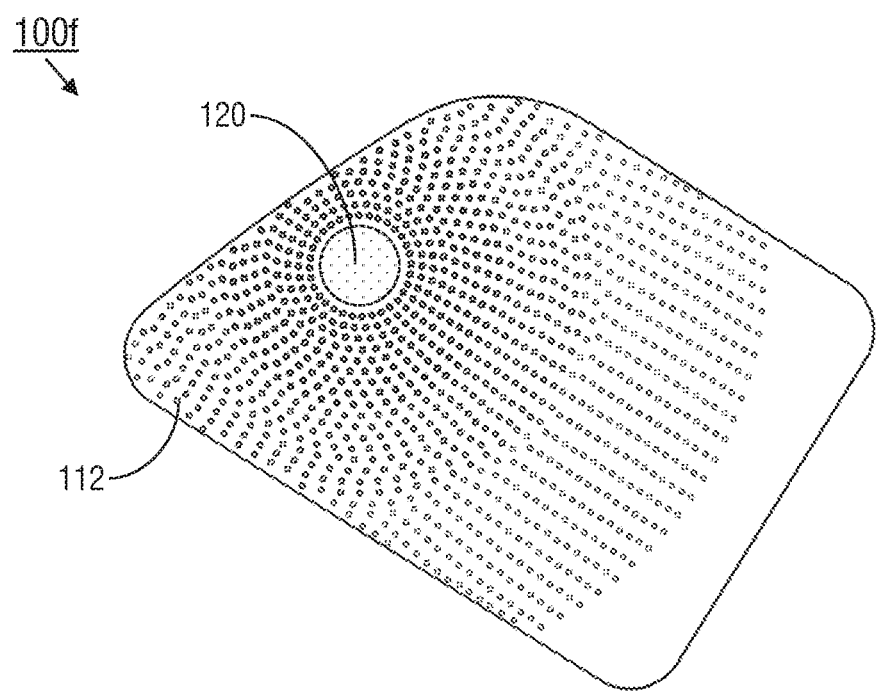
Figure 4D:
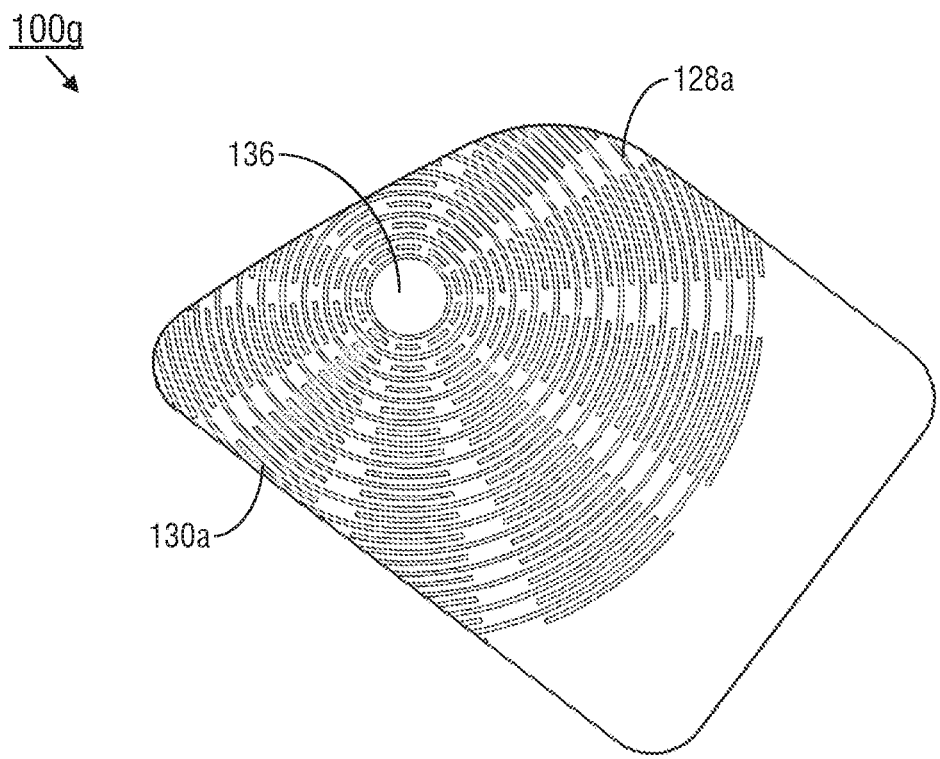

Referring in particular to FIG. 4B, the reactive wireless charging surface 100e may respond to the placement of a PED 126 over the wireless charging device (122, FIG. 2A) by illuminating its component LEDs 112 according to pre-programmed aesthetically pleasing patterns that may not directly indicate the progress of the charging of the PED 126 while indicating that the charge is ongoing. For example, the reactive wireless charging surface 100e may "sparkle" by dynamically displaying a random or pseudorandom group of LEDs 112 while charging continues, similarly switching to a static or dynamic pattern of illuminated LEDs to indicate that charging is complete. Referring in particular to FIG. 4D, the reactive wireless charging surface 100g may display a charging status similarly to the reactive wireless charging surfaces 100d, 100f of FIGS. 4A and 4C, except that the reactive wireless charging surface 100g may incorporate blind slots (128a) and through slots (130a) set into the reactive outer surface 110.

Figure 5A:
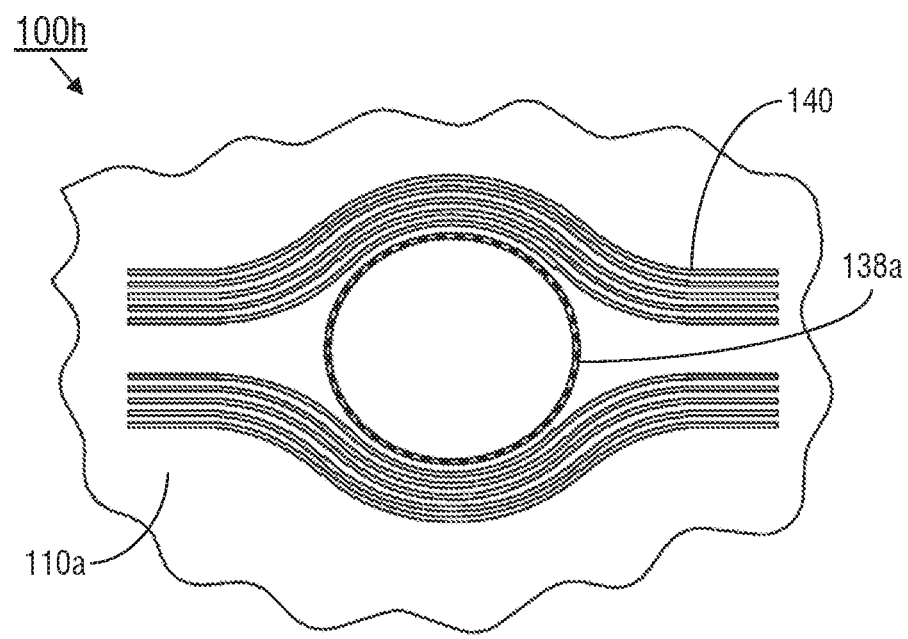
FIGS. 5A and 5B illustrate an exemplary embodiment of a reactive illuminated wireless charging surface according to the inventive concepts disclosed herein.
Figure 5B:
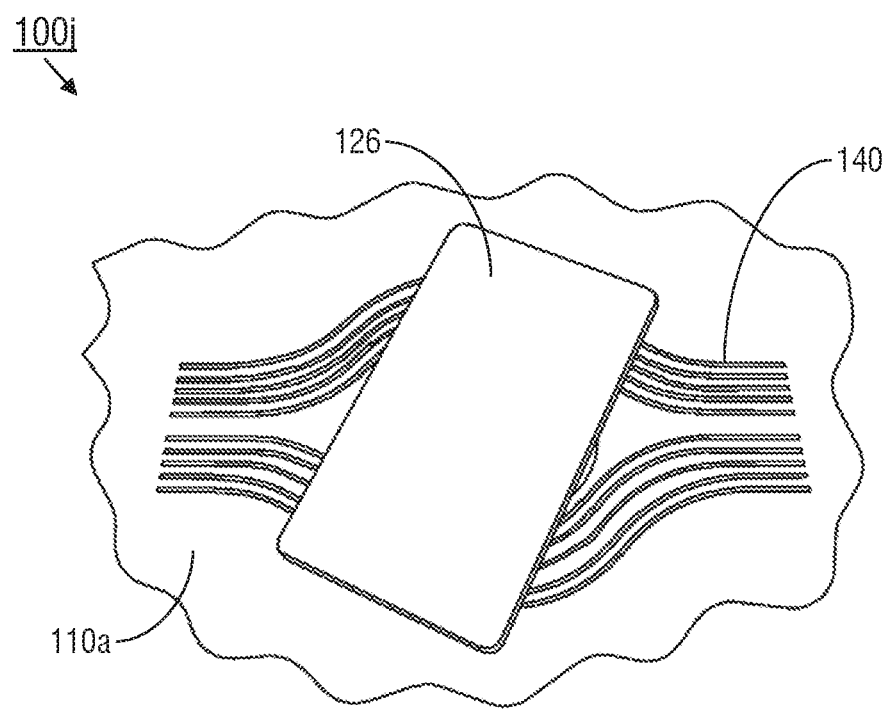

Referring to FIGS. 5A and 5B, the reactive wireless charging surfaces 100h-j may be implemented and may function similarly to the reactive wireless charging surfaces 100d-g of FIGS. 4A through 4D, except that the reactive wireless charging surfaces 100h-j may incorporate strips (140) of sequential LEDs (112, FIG. 5B) to indicate a charging status. For example, patterns may be set into a reactive outer surface (110a) which may be implemented and may function similarly to the reactive outer surface 110 of FIG. 3 except that the reactive outer surface 110a may be translucent or opaque, and the LED strips 140 mounted thereinto and filled in with a transparent or translucent encapsulant. Alternatively, the LED strips 140 may be disposed beneath blind slots (128a, FIG. 2A) or through slots (130a, FIG. 2A) set into the reactive outer surface 110a. The patterns and LED strips 140 may correspond to an LED ring (138a) indicating the relative position of the wireless charging device (120, FIG. 2A) in a dormant or non-charging state. Referring in particular to FIG. 5B, the LED strips (140) may indicate the charging status of the reactive wireless charging surfaces 100g when the PED 126 is placed over the wireless charging device, e.g., via dynamic or sequential shifts or pulses in color or intensity along each individual LED strip 140, either individually or as a group.

Figure 6:
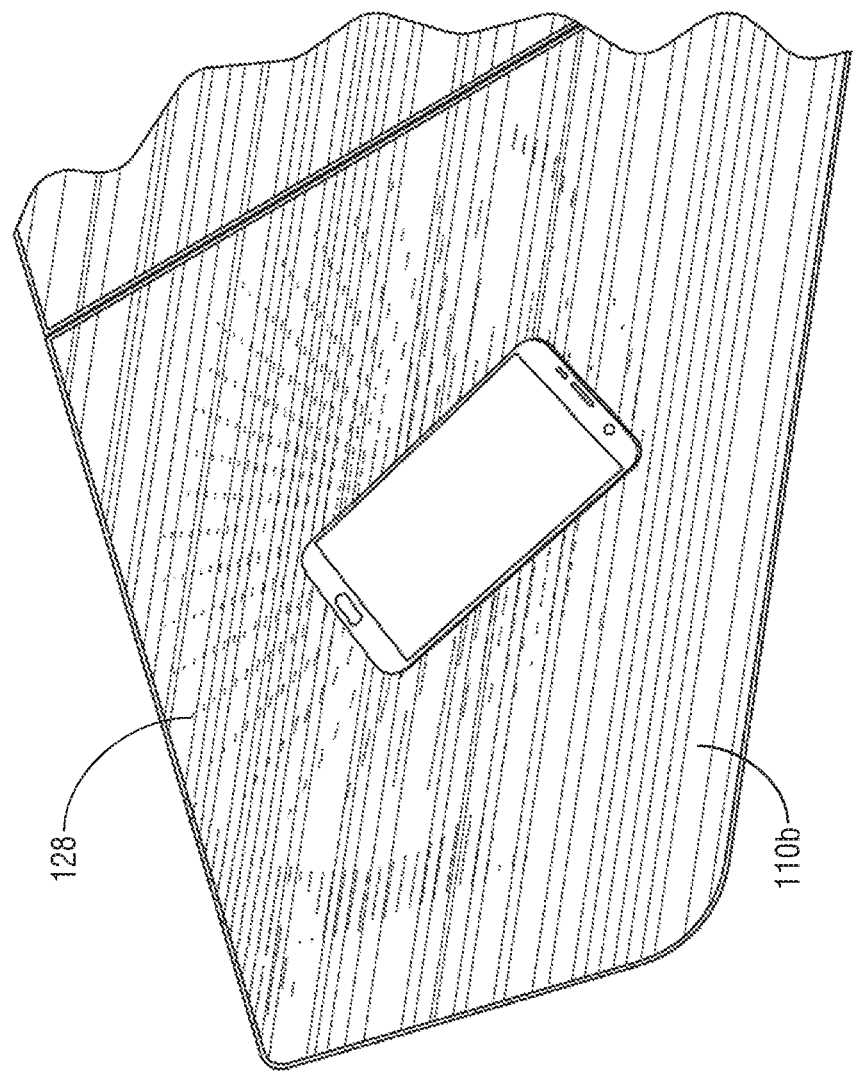
FIG. 6 illustrates the reactive illuminated wireless charging surface of FIG. 2A.

Referring to FIG. 6, the reactive wireless charging surface 100k may be implemented and may function similarly to the reactive wireless charging surfaces 100d-g of FIGS. 4A through 4D, except that the reactive wireless charging surface 100k may incorporate an opaque outer surface (110b) configured to mimic the outward appearance of wood or any appropriate natural or decorative material, e.g., various types of stone, bamboo, concrete, or metal. The outer surface 110b may include blind holes (128), blind slots (128a, FIG. 2A), through holes (130, FIG. 2A) or through slots (130a, FIG. 2A) aligned with the underlying LED array (112, FIG. 2A; or aligned with groups of LEDs thereof) to optimize luminous transmission through the outer surface. The outer surface 110b may further be treated on its underside (not shown; e.g., the face proximate to the LED array 112) to prevent scattering of the luminous output, e.g., via masking with an opaque stencil.

As will be appreciated from the above, systems and methods according to embodiments of the inventive concepts disclosed herein may provide aesthetically pleasing, practical, and brand-conscious means of displaying the charging status of a wireless charging device incorporated into a seating module or worksurface aboard an aircraft or other vehicle.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An illuminated wireless charging surface, comprising:
    at least one exterior substrate fashioned of an at least partially translucent material;
    at least one wireless charging device disposed beneath a charging portion of the exterior substrate, the wireless charging device configured to charge a portable electronic device (PED) placed on the charging portion;
    at least one array of one or more individually addressable luminous devices arranged on a printed circuit board (PCB) disposed beneath the exterior substrate; and
    a display controller coupled to a power source and comprising:
        at least one processor;
        a memory configured to store at least one predetermined pattern; and
        drive electronics configured to drive the array of one or more luminous devices to indicate a charging status of at least one of the wireless charging device and the PED according to the predetermined pattern.

2. The illuminated wireless charging surface of claim 1, wherein the one or more luminous devices include at least one of a white light-emitting diode (LED) and a red/green/blue (RGB) LED.

3. The illuminated wireless charging surface of claim 1, wherein the charging status includes at least one of:
    a location of the charging portion;
    an ongoing charge;
    a completed charge; and
    an error state.

4. The illuminated wireless charging surface of claim 1, wherein the exterior substrate comprises:
    an outer surface;
    an inner surface proximate to the array of luminous devices;

and at least one of a blind hole and a blind slot extending partially from the inner surface to the outer surface, each blind hole corresponding to a luminous device of the array.

5. The illuminated wireless charging surface of claim 1, wherein the exterior substrate comprises:

an outer surface;

an inner surface proximate to the array of luminous devices;

and at least one of a through hole and a through slot fully extending from the inner surface to the outer surface, each through hole or through slot at least partially filled with a diffusing material capable of diffusing the luminous output, each through hole corresponding to a luminous device of the array.

6. The illuminated wireless charging surface of claim 1, wherein the external substrate further comprises:

a planar portion corresponding to the charging portion;

and at least one nonplanar portion not corresponding to the charging portion.

7. The illuminated wireless charging surface of claim 6, wherein the PCB includes at least one flexible PCB, the flexible PCB at least partially contoured to the nonplanar portion.

8. The illuminated wireless charging surface of claim 1, wherein the at least one array of luminous devices includes at least one strip of connected luminous devices.

9. The illuminated wireless charging surface of claim 1, wherein the exterior substrate includes at least one opaque portion fashioned of an opaque material.

10. An illuminated wireless charging surface, comprising:

at least one exterior substrate fashioned of an at least partially opaque material and having an inner surface and an outer surface;

at least one wireless charging device disposed beneath a charging portion of the exterior substrate and configured to charge a portable electronic device (PED) placed on the charging portion;

at least one array of one or more individually addressable luminous devices arranged on a printed circuit board (PCB) disposed beneath the exterior substrate;

at least one of a hole and a slot extending at least partially from the inner surface to the outer surface, each hole corresponding to and aligned with a luminous device of the at least one array, each slot corresponding to and aligned with a group of luminous devices of the at least one array;

and a display controller coupled to a power source and comprising:

at least one processor;

a memory configured to store at least one predetermined pattern;

and drive electronics configured to drive the array of one or more luminous devices to indicate a charging status of at least one of the wireless charging device and the PED according to the predetermined pattern.

11. The illuminated wireless charging surface of claim 10, wherein the at least one of a hole and a slot partially extends from the inner surface to the outer surface.

12. The illuminated wireless charging surface of claim 10, wherein:

the at least one of a hole and a slot fully extends from the inner surface to the outer surface;

and the at least one of a hole and a slot is at least partially filled with a diffusing material capable of diffusing the luminous output.

13. The illuminated wireless charging surface of claim 10, wherein the partially opaque material is configured to mimic the appearance of at least one of wood, metal, stone, bamboo, concrete, and a decorative material.

14. The illuminated wireless charging surface of claim 10, wherein the one or more luminous devices include at least one of a white light-emitting diode (LED) and a red/green/blue (RGB) LED.

15. The illuminated wireless charging surface of claim 10, wherein the charging status includes at least one of:

a location of the charging portion;

an ongoing charge;

a completed charge;

and an error state.

16. The illuminated wireless charging surface of claim 10, wherein the substrate further comprises:

a planar portion corresponding to the charging portion;

and at least one nonplanar portion not corresponding to the charging portion.

17. The illuminated wireless charging surface of claim 16, wherein the PCB includes at least one flexible PCB, the flexible PCB at least partially contoured to the nonplanar portion.

18. The illuminated wireless charging surface of claim 10, wherein the at least one array of luminous devices includes at least one strip of connected luminous devices.

\* \* \* \* \*